137-13

7/26/77 XR 4,037,618

SR

United States Patent [19]

Kresser et al.

[11] 4,037,618

[45] July 26, 1977

[54] APPARATUS FOR MIXING FRICTION-REDUCING ADDITIVE TO WATER

[75] Inventors: Anton Kresser, Wedel, Holstein; Jens Bastein, Friedrichstadt, both of Germany

[73] Assignee: Licentia Patent-Verwaltungs-G.m.b.H., Frankfurt am Main, Germany

[21] Appl. No.: 439,299

[22] Filed: Feb. 4, 1974

[30] Foreign Application Priority Data

Feb. 3, 1973 Germany ............................ 2305376

[51] Int. Cl.[2] ............................................ F16K 19/00

[52] U.S. Cl. ...................................... 137/266; 137/13; 137/240; 137/564.5; 137/599; 137/604

[58] Field of Search ................... 114/67 R; 137/3, 13, 137/266, 267, 564.5, 599, 604, 240; 417/183, 184

[56] References Cited

U.S. PATENT DOCUMENTS

| | | | |
|---|---|---|---|
| 2,840,147 | 6/1958 | Almestad | 137/266 |
| 2,865,388 | 12/1958 | Sternbergh | 137/564.5 |
| 3,392,753 | 7/1968 | Kleinmann | 137/564.5 |
| 3,601,079 | 8/1972 | Giles et al. | 114/67 R |
| 3,643,688 | 2/1972 | Meinert | 137/604 X |
| 3,900,043 | 8/1975 | Bowen et al. | 137/604 X |

FOREIGN PATENT DOCUMENTS

| | | | |
|---|---|---|---|
| 1,180,095 | 2/1970 | United Kingdom | 137/604 |

*Primary Examiner*—Alan Cohan
*Assistant Examiner*—Gerald A. Michalsky
*Attorney, Agent, or Firm*—Spencer & Kaye

[57] ABSTRACT

To a water stream, during the steady flow conditions thereof, a friction-reducing additive is introduced from a vessel through a supply line by means of a mixing nozzle. During the transient flow conditions of the water stream, for preventing the admixture of the friction-reducing additive into the water stream, instead of this additive a buffer liquid is introduced into the supply line between the vessel and the mixing nozzle.

12 Claims, 6 Drawing Figures

APPARATUS FOR MIXING FRICTION-REDUCING ADDITIVE TO WATER

BACKGROUND OF THE INVENTION

The present invention relates to an apparatus for preventing inadvertent admixture of friction-reducing additives to water in transient flow conditions, such as, for example, during starting and shutdown. The apparatus has a reservoir for the additives, and is connected, by means of a supply line, with a mixing nozzle for admixing the additives to the water.

German Laid Open Patent Application (Offenlegungsschrift) No. 2,051,873 discloses a method and apparatus for mixing soluble polymer materials with a liquid and teaches, in particular, the easy and effective mixing of soluble materials with a liquid solvent. With this method and apparatus flow resistance-reducing solutions can be produced in a continuous manner.

The method and apparatus disclosed in the cited Offenlegungsschrift serve to mix an additive with a liquid in order to inject this mixture into a boundary layer for the reduction of friction between the liquid and the surface of a body moving relative to the liquid. In particular, it is possible to utilize the method and the apparatus in navigation for the quick admixture of a polymer additive to water. The polymer is effectively hydrated immediately prior to its injection along the surface where friction is to be reduced.

In the cited Offenlegungsschrift an apparatus is described for admixing friction-reducing additive. The apparatus includes a mixing chamber for rapidly forming a suspension of the soluble polymer material in a solvent, a vessel for hydrating the suspension and an apparatus for injecting the resulting solution into the boundary layer with a flow speed sufficient for a reduction in friction. The susepension is hydrated in this case until a substantial solution of the polymer has been formed; the solution has a stronger concentration than required for the reduction of friction. The mixing chamber may include an arrangement in which the polymer material is brought into contact with a jet stream of solvent and which the hydration continues during the passage of the solution. Means may also be provided for thinning the solution with added solvent. This apparatus has the drawback that during transient flow conditions, such as during starting and shutdown, clogging may occur in the polymer supply lines, because during these flow phases it is possible for the polymer suspension to change its direction of movement. This immediately has the result that the individual polymer molecules of the suspension form with water either lumps in high concentrations, or a very viscous immovable solution. It has been found in practice that restarting is them impossible and the mixing assembly forming the mixing circuit must be disassembled.

SUMMARY OF THE INVENTION

It is therefore an object of the present invention to provide a method and an apparatus which are free from the above-mentioned drawback, i.e. the inadvertent admixture of friction-reducing additives to the water during transient flow phases, and thus eliminate clogging of the supply lines.

This and other objects to become apparent as the specification progresses, are achieved by the invention, according to which, briefly stated, during the transient flow conditions of the water stream, for preventing the admixture of the friction-reducing additive into the water stream, instead of this additive a buffer liquid is introduced into the supply line connecting the additive-containing vessel and the mixing nozzle disposed in the flow path of the water stream.

The advantage of the present invention is that fault-free operation is possible with relatively simple technical means. It is assured that the assembly can be started or shut down as often as desired, even at longer intervals.

According to one embodiment of the present invention, for use with a stream of water in a main pipeline, a mixing circuit is provided in a branch connection. The mixing circuit includes a mixing nozzle, a reservoir for the additives as well as a hydration tank. In this embodiment, a portion of the main stream is branched off to supply this mixing circuit with water. The resulting mixture of water and additives is reintroduced into the main current at a downstream location. The mixing nozzle is adjustable and a three-way valve is provided in the supply line for the friction-reducing additives. The three-way valve is additionally connected to a supply line for the blocking or buffer liquid stored in a vessel. During transient flow passes this three-way valve opens the path between the vessel for the blocking or buffer liquid and the mixing nozzle, while simultaneously blocks admission, to the mixing nozzle, of the friction-reducing additives. During steady flow phases the path between the additive-containing reservoir and the mixing nozzle is opened while admission of the buffer liquid is blocked. The advantage of this embodiment is that the entire mixing circuit does not require any external energy but can be started up and driven by the main current-flowing in the main pipe line.

According to a further embodiment of the present invention the mixing nozzle has two nozzle parts which can be displaced with respect to one another in an axial direction. The parting line of the nozzle parts is disposed at the narrowest nozzle cross section. The displacement of one nozzle part adjusts a dosaging gap and thus alters the input from an annular channel to the partial stream flowing through the mixing nozzle. The annular channel is disposed at the parting line and is mechanically rigidly connected through a conduit with a connecting stud of the three-way valve. A continuous fine adjustment of the dosaging gap can be effected with the aid of a knurled nut whose thread cooperates with a counterthread disposed at one nozzle part or via a pressure chamber with a spring-supported piston. The mixing nozzle according to the invention permits a relatively fine dosing with a relatively large cross section without the mixing stream being noticeably interfered with by the partial stream as a result of an adjustment in the nozzle.

An apparatus for mixing and homogenizing, particularly for producing oil/water emulsions is disclosed, for example, in German Published Patent Application (Auslegeschrift) No. 1,508,977. In this apparatus a booster nozzle which injects the pressure fluid and draws the medium to be admixed is connected to a diffuser which, in turn, is connected to a homogenizing device formed of a rotating beater mechanism. The diffusor is provided with a stationary core which extends with its cylindrical portion into the longitudinal bore of the booster nozzle and forms an annular channel therewith. The superficies of the widening diffuser core portion are provided with longitudinal and/or transverse ribs or grooves. The homogenizing device which comprises a rotating batter mechanism is driven by a driver wheel which is charged with the fluid mixture flowing out of the annular cross section of the diffusor. This apparatus which, in contradistinction to the mixing nozzle of the present invention, is intended to produce a continuous flow of a homogeneous liquid with a composition which can be set according to the desired purpose, is not suited as a mixing nozzle for admixing chemical additives to water, since the grid structure and the turbine wheel would lead to a mechanical destruction of the macromolecules. Also, due to the lateral introduction of the main stream, this known device has a relatively poor degree of efficiency.

Further, according to the invention, an automatic regulator is provided instead of the three-way valve, so that the switching from the transient to the steady flow state, or conversely, is effected automatically.

The vessels for the blocking or buffer liquid and for the friction-reducing additives may be connected to the mixing circuit via a branch line. In the alternative, a pressure apparatus may be associated with the storage vessels for driving the chemical additives and/or the blocking or buffer liquid. The friction-reducing additives in the supply vessel or the blocking or buffer liquid in their storage tank may be separated from the driving media by rolling diaphragms.

According to a further embodiment of the invention the liquid circuit includes a hydration tank which is provided with a displaceable bottom for optimally setting its hydration period by changing its volume.

The present invention may find advantageous application particularly for fire hoses to reduce friction in the hoses. This advantageously results in an increase in the quantity of water flowing through the hoses and in an increased range and concentration of the ejected stream of water.

DESCRIPTION OF THE PREFERRED EMBODIMENTS

Figure 1:
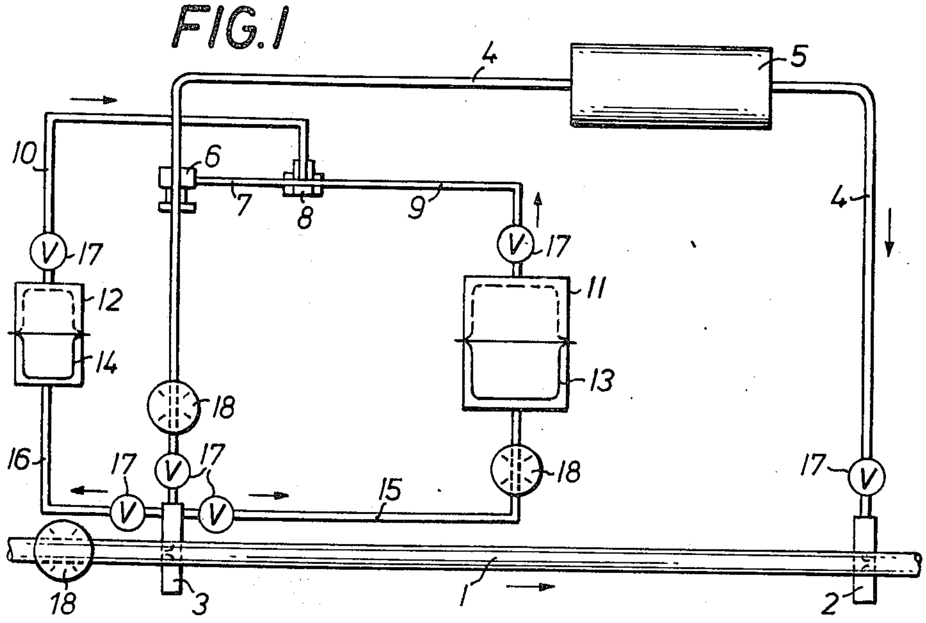
FIG. 1 schematically shows the entire system of the apparatus according to the invention.

Turning now to FIG. 1, the apparatus for preventing inadvertent admixture of friction-reducing additives to water during transient flow conditions includes a main pipeline 1 through which a stream of water is pumped with the aid of a pump (not shown). The main pipeline 1 may be, for example, a fire hose in which the quantity of water flowing therethrough or the range of the ejected stream of water is to be increased by reducing the friction in the main pipeline 1 by the admixture of chemical additives. For this purpose a mixing nozzle (outlet) 2 and a dynamic pressure nozzle (inlet) 3 are disposed in the main pipeline 1. The further connecting studs of the mixing nozzle 2 and the dynamic pressure nozzle 3 are permanently mechanically connected together via a supply line 4. The supply line 4 is brought through a hydration tank 5 and is provided with a mixing nozzle 6 between the hydration tank and the dynamic pressure nozzle 3. The mixing nozzle 6 will be described in detail in connection with FIGS. 2 and 3. A supply line 7 is connected to the mixing nozzle 6 and leads to a routing device, such as a three-way valve 8. The further ports of the three-way valve 8 are connected with two supply lines 9 and 10, respectively.

Figure 4A:
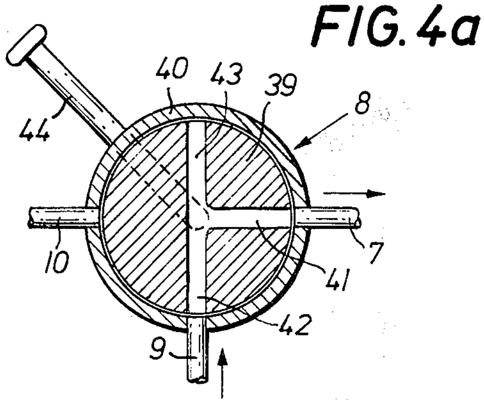
FIGS. 4*a*, 4*b* and 4*c* are schematic cross-sectional views of a three-way valve forming part of the apparatus and shown in different positions.
Figure 4B:
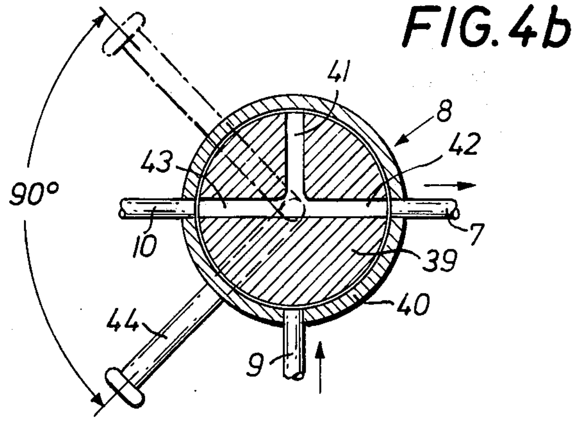
Figure 4C:
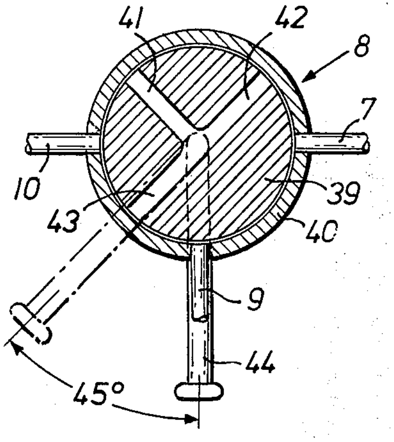

The valve 8 includes a valve body 40 and a valve plug 39 with a handle-like member 44 with which the valve can be switched (shown in FIGS. 4*a*–4*c*). The valve plug 39 has three ports 41, 42 and 43. In FIG. 4*a* line 7 is connected with line 9 via ports 41 and 42. In FIG. 4*b* line 7 is connected with line 10 via ports 42 and 43. In FIG. 4*c* the communications between the lines 7, 9 and 10 are blocked. The supply line 9 leads to a reservoir 11 containing friction-reducing additives and the supply line 10 leads to a vessel 12 containing blocking or buffer fluid. In each container 11 and 12 there is disposed a rolling diaphragm 13 and 14, respectively, which divides the associated vessel 11 or 12 into two compartments and thus serves to separate the friction-reducing additives or the blocking or buffer liquid, as the case may be, from the driving media. In this embodiment, in both the reservoir 11 and the vessel 12 the driving medium is water which is taken from the main pipeline 1. For this purpose branch lines 15 and 16, connected to vessels 11 and 12, respectively, are coupled to the supply line 4 in the vicinity of the dynamic pressure nozzle 3 and to supply line 4. All lines are provided with additional valves 17 in the vicinity of the zone where they are connected to the dynamic pressure nozzle 3, the mixing nozzle 2, vessels 11 and 12, respectively. The valves 17 prevent a reverse flow of the driving media, the chemical additives, the blocking or buffer liquid and the polymer solution, respectively. Furthermore, volumeters 18 may be provided in the individual lines to measure the rate of flow.

The chemical additives in the reservoir 11 may be any kinds of polymers and additives which have the property of reducing friction when they are mixed with a liquid. Generally, the polymer is suspended in the reservoir 11 in a solution of neutral density which has the same specific weight as the polymer and does not react with the polymer. An example for such a solution is a neutral density solution of ethylene glycol to which lead acetate or zinc iodide has been added. A further possibility is a combination of alcohols, e.g. glycerin.

Alcohols can also be used as the blocking or buffer liquid. The specific weight of the blocking or buffer liquid must be the same as the polymer or the solution of neutral density. It is advisable to use a blocking or buffer liquid, which has the same viscosity as the solution. In this manner it is avoided that the blocking or buffer liquid is mixed with the solution of neutral density.

Instead of branch lines 15, 16 with which the driving medium (water) can be tapped from the main pipeline 1, it is also possible to connect pressure devices to the vessels 11 and/or 12 to convey the chemical additives and/or the blocking or buffer liquid. With such an arrangement driving media other than water can be utilized.

The operation of the entire apparatus will be described for a flow phase during shutdown. If a stream of water flows through the main line 1, part of this stream flows through the dynamic pressure nozzle 3 into the supply line 4 and into the branch lines 15 and 16. In the supply line 4 a continuous stream is produced which flows through the hydration tank 5 and mixing nozzle 2 back into the main pipeline 1. The water flowing into branch lines 15 and 16, however, will be stopped when it comes into contact with the diaphragms 13 and 14 contained in vessels 11 and 12, respectively. A pressure is then exerted on diaphragms 13 and 14 so that the chemical additives from the reservoir 11 are pressed into the supply line 9 and the blocking or buffer liquid is pressed from vessel 12 into supply line 10. In the position of the three-way valve 8 shown in the drawing, the reservoir 11 is connected with the mixing nozzle 6 via supply lines 9 and 7, while the communication between the vessel 12 and the mixing nozzle 6 is blocked. The chemical additives from the reservoir 11 reach the mixing nozzle 6 where they are mixed to the stream of water flowing through the supply line 4. This mixture is hydrated in hydration tank 5 and then fed, via the mixing nozzle 2, to the stream of water in the main pipeline 1. The hydration tank 5 may have a displaceable bottom so that the hydration period can be optimally set by changing the volume of the tank. It has been discovered that enough time must be allowed during the hydration period to produce a uniform solution of substantially all the polymer additive present in the mixture. A usable hydration tank, which has a honeycomb or similar structure, is described in U.S. Pat. No. 3,601,079. One bottom of this hydration tank can be arranged movable and in a sealed, liquid-tight manner in the hollow body of the tank.

Figure 2:
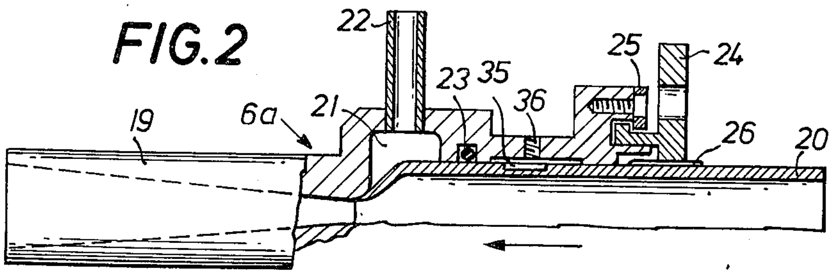
FIGS. 2 and 3 are axial sectional views of mixing nozzles forming part of the apparatus.
Figure 3:
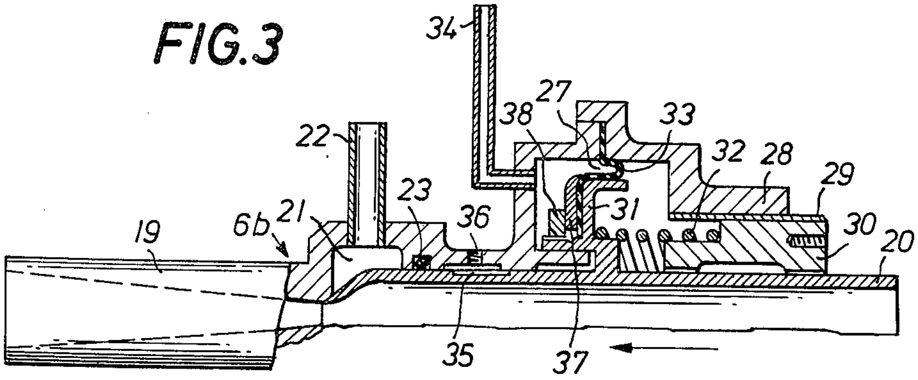

In order to be able to properly shut down the system, first the three-way valve 8 is brought into its second position so that the vessel 12 containing the blocking or buffer liquid is brought into communication with the mixing nozzle 6 via the supply lines 10 and 7. Simultaneously, communication between the vessel 11 and the mixing nozzle 6 is blocked. The blocking or buffer liquid presses the remainder of the chemical additives present in supply line 7 into the supply line 4. As soon as supply line 7 and the entrance opening of the mixing nozzle 6 are filled with the blocking or buffer liquid, the apparatus can be shut down without the danger of clogging of the lines or the nozzle, respectively. The apparatus is shut off by closing off the mixing nozzle 6. For this purpose the nozzle parts 19 and 20, which are shown in the FIGS. 2 and 3, are axially displaced with respect to one another until the metering gap between the nozzle parts 19 and 20 is closed. A problem-free renewed starting of the apparatus is then also possible.

Instead of the three-way valve 8 an automatic control mechanism may be provided with which it is possible to automatically switch from a transient to a steady flow condition, or conversely. It is also possible, to provide an automatic control mechanism together with the three-way valve 8. In this case the shaft end of an adjusting motor is attached to the valve plug 39 of the three-way valve 8 instead of the handle-like member 44, which is shown in the FIGS. 4*a*, 4*b* and 4*c*. The pilot signals for the adjusting motor are ascertained by flow-sensors and are conveyed via conductors to the inputs of the adjusting motor. The flow-sensors are arranged in the supply line 4, but it is also possible to arrange them in the main pipeline 1.

The operation of the automatic control mechanism will be described for a flow phase during shutdown. If a continuous stream is produced in the supply line 4, which flows through the hydration tank 5 and mixing nozzle 2 back into the main pipeline 1, the adjusting motor holds the three-way valve 8 in its first position, which is shown in FIG. 4*a*. In this position the supply line 7 is connected with valve ports 9 via supply lines 41 and 42. The communication between line 7 and line 10 is blocked. The chemical additives from the reservoir 11 can reach the mixing nozzle 6.

If the flow velocity in the supply line 4 exceeds a given value, the adjusting motor receives a pilot signal from the flow-sensors and is started. The valve plug 39 is switched into its second position, which is shown in FIG. 4*b*. In this position the supply line 7 is connected with supply line 10 via valve ports 42 and 43. The communication between line 7 and line 9 is blocked. The blocking or buffer liquid is brought into communication with the mixing nozzle 6 via the supply lines 10 and 7. For this automatic control operation it is not necessary to shut off the apparatus by closing off the mixing nozzle 6.

FIG. 2 shows a mixing nozzle 6*a* in detail. The mixing nozzle 6*a* performs the function of the mixing nozzle 6 schematically shown in FIG. 1. The mixing nozzle 6*a* includes two nozzle parts 19 and 20 which can be axially displaced with respect to one another. The nozzle part 20 partially extends, in a telescoping manner, into the nozzle part 19. The plane or line of separation between the two nozzle parts coincides with the narrowest cross section of the nozzle. At this location, the nozzle part 19 is provided with an annular channel 21 which is in communication with an inlet nipple 22 and which surrounds the front end of the nozzle part 20. An O-ring seal 23 is provided between nozzle parts 19 and 20 in that wall of the annular channel 21 which lies remote from the opening of the nozzle part 20. The mixing nozzle receives, via the inlet nipple 22 and the annular channel 21, either the chemical additives or the blocking or buffer fluid, while the stream of water to which the chemical additives are to be admixed, passes through nozzle parts 19 and 20. The inlet nipple 22 is part of the supply line 7 of FIG. 1.

For generating or adjusting a metering gap between the nozzle parts 19 and 20, the nozzle part 20 is axially displaceable by means of a knurled nut 24 which is rotatably secured to the nozzle part 19 with the aid of a divided disc 25. The thread (not shown) of the knurled nut 24 cooperates with a counterthread 26 provided on the circumference of the nozzle part 20 so that when the nut is turned, the nozzle part 20 moves in the axial direction of the mixing nozzle. In order to permit as fine an adjustment of the dosaging gap as possible, it is advisable to use a fine thread. It is also advantageous to so design the nozzle parts 19 and 20 that the walls defining the dosaging gap are, at the location of separation between the nozzle parts 19 and 20, inclined with respect to the flow in the parts 19, 20. This has the result that the chemical additives are carried along by the stream of water from the annular channel 21 through the dosaging gap without the possibility that the chemical additives form lumps.

Another embodiment of a mixing nozzle performing the function of the mixing nozzle 6 of FIG. 1 is illustrated in FIG. 3 and is generally designated at 6*b*. The mixing nozzle 6*b* is provided with an automatic device for adjusting the dosaging gap. This apparatus includes a pressure chamber 27 connected to nozzle part 19. That frontal wall (wall 28) of the pressure chamber 27 which is farthest removed from the center of the mixing nozzle cooperates with a clamping element 30 by means of a fine thread 29. A piston 31 which is permanently mechanically connected with nozzle part 20 protrudes into pressure chamber 27. Between the piston 31 and the clamping element 30 there is disposed a compression spring 32 whose bias can be adjusted with the aid of the clamping element 30. A rolling diaphragm 33 which is fastened to the piston 31 and to a wall of the pressure chamber 27, divides the pressure chamber 27 into two parts. The part of the pressure chamber 27 which does not contain the compression spring 32 can be charged with fluid via a supply line 34 so that the piston 31 and the nozzle part 20 are moved in an axial direction against the force of the compression spring 32. The supply line 34 may be connected to the dynamic pressure nozzle 3, whereby the displacement of the piston 31 and the nozzle part 20 is proportional to the pressure derived from the dynamic pressure nozzle 3. Thus the adjustment of the dosaging gap can be regulated in dependence of the dynamic pressure.

FIGS. 2 and 3 show grooves 35 which are provided for preventing rotation of the nozzle part 20 in the nozzle part 19. A threaded pin (not shown) disposed in a threaded bore 36 provided in the nozzle part 19 projects into each groove 35. FIG. 3 also shows a cover plate 37 which is provided at piston 31 to fasten the rolling diaphragm 33. The cover plate 37 presses the rolling diaphragm 33 to the piston 31 by means of a nut 38.

It is noted that in all drawing figures the directions of flow of the various liquids in the pipes and nozzles are indicated by arrows.

It will be understood that the above description of the present invention is susceptible to various modifications, changes and adaptations, and the same are intended to be comprehended within the meaning and range of equivalents of the appended claims.

We claim:

1. An apparatus for mixing a friction-reducing additive to water, comprising in combination:

a. a first supply line for defining a flow path for a water stream;

b. a mixing nozzle coupled to said first supply line and being disposed in said flow path;

c. a vessel for accommodating a friction-reducing additive;

d. a second supply line connecting said mixing nozzle to said vessel, said second supply line defining a flow path for the friction-reducing additive;

e. a third supply line connected to said second supply line between said vessel and said mixing nozzle, said third supply line defining a flow path for a buffer liquid;

f. routing means coupled to said second and third supply lines, said routing means having a first position in which communication is maintained between said vessel and said mixing nozzle for introducing, by means of said mixing nozzle, the friction-reducing additive to the water stream flowing in said first supply line, in said first position communication is blocked between said third supply line and said second supply line, said routing means having a second position in which communication is maintained between said second and third supply lines for introducing the buffer liquid into said second supply line, in said second position communication is blocked between said vessel and said mixing nozzle; and g. means for switching said routing means from one of its said positions into the other.

2. An apparatus for mixing friction-reducing additives to water, comprising in combination:

a. a main pipe line defining a flow path for a main water stream;

b. a first supply line having an inlet connected to said main pipe line and an outlet connected to said main pipe line at a location downstream of said line inlet, said first supply line defining a flow path for a partial water stream taken from said main pipe line through said line inlet and reintroduced into said main pipe line through said line outlet;

c. a mixing nozzle coupled to said first supply line and disposed in the flow path defined by said first supply line;

d. a first vessel for accommodating a friction-reducing additive;

e. a second supply line connecting said first vessel to said mixing nozzle, said second supply line defining a flow path for the friction-reducing additive;

f. a second vessel for accommodating a buffer liquid;

g. a third supply line connected to and extending from said second vessel, said third supply line defining a flow path for the buffer liquid;

h. a routing means coupling said third supply line to said second supply line at a location between said first vessel and said mixing nozzle; said routing means having a first position in which communication is maintained between said first vessel and said mixing nozzle for introducing, by means of said mixing nozzle, the friction-reducing additive to the partial water stream flowing in said first supply line, in said first position of said routing means communication is blocked between said third supply line and said second supply line; said routing means having a second position in which communication is maintained between said second and third supply lines for introducing the buffer liquid from said second vessel into said mixing nozzle; in said second position of said routing means communication is blocked between said first vessel and said mixing nozzle; and i. means for switching said routing means from one of its said positions into the other.

3. An apparatus as defined in claim 2, wherein said routing means is a three-way valve.

4. An apparatus as defined in claim 2, said mixing nozzle having a. a first tubular nozzle part having an axis and including means defining a central flow path of varying diameter along said axis;

b. a second tubular nozzle part including means defining a central flow path, said second tubular nozzle part being inserted telescopically into said first nozzle part, said central flow paths forming part of said first supply line; said first nozzle part and said second nozzle part having a separating line disposed in the zone of the narrowest cross section of said first nozzle part;

c. means defining in said first nozzle part an annular channel surrounding said second nozzle part; the portion of said second supply line extending between said mixing nozzle and said routing means is in continuous communication with said annular channel; and d. means for axially moving said nozzle parts with respect to one another for varying the width of an annular flow passage section between said annular channel and said central flow paths of said two nozzle parts, said annular flow passage section constituting a dosaging gap through which liquid from one of said vessels is introduced into said first supply line.

5. An apparatus as defined in claim 4, said dosaging gap being defined by wall portions of said nozzle parts, said wall portions being inclined in the same direction with respect to the axis of said nozzle parts.

6. An apparatus as defined in claim 4, wherein said means for axially moving said nozzle parts includes:

a. a thread circumferentially extending on one of said nozzle parts;

b. an adjusting wheel surrounding said one of said nozzle parts, said adjusting wheel having a thread in engagement with the thread on said one of said nozzle parts; and c. mounting means for rotatably securing said adjusting wheel to the other of said nozzle parts.

7. An apparatus as defined in claim 4, wherein said means for axially moving said nozzle parts includes:

a. piston means affixed to one of said nozzle parts;

b. means defining a pressure chamber in the other of said nozzle parts, said piston means being movably disposed in said pressure chamber;

c. means for introducing fluid under pressure into said pressure chamber for exerting a force on said piston means; and d. spring means connected to said piston means for opposing the movement of said piston means in one direction and for aiding the movement of said piston means in another, opposite direction.

8. An apparatus as defined in claim 4, wherein said central flow paths of said first and second tubular nozzle parts have an unobstructed cross section; and said annular flow passage section constitutes the sole dosaging gap in said mixing nozzle.

9. An apparatus as defined in claim 2, wherein each said vessel includes pressure means to displace the liquid stored therein towards said mixing nozzle.

10. An apparatus as defined in claim 9, wherein said pressure means includes a rolling diaphragm secured within each vessel, said diphragm dividing the vessel into a pressure compartment and into a liquid-storing compartment.

11. An apparatus as defined in claim 10 wherein the pressure compartment of each said vessel communicates with said main pipeline through a separate branch conduit.

12. An apparatus as defined in claim 2, including a hydration tank connected into said first supply line between said mixing nozzle and said outlet.

* * * * *